Feb. 21, 1939.　　　　C. O. BERGSTROM　　　　2,148,254
CENTRIFUGAL FAN
Filed Oct. 1, 1937　　　　2 Sheets-Sheet 1

Inventor
CARL O. BERGSTROM
by Robert T. Palmer
Attorney

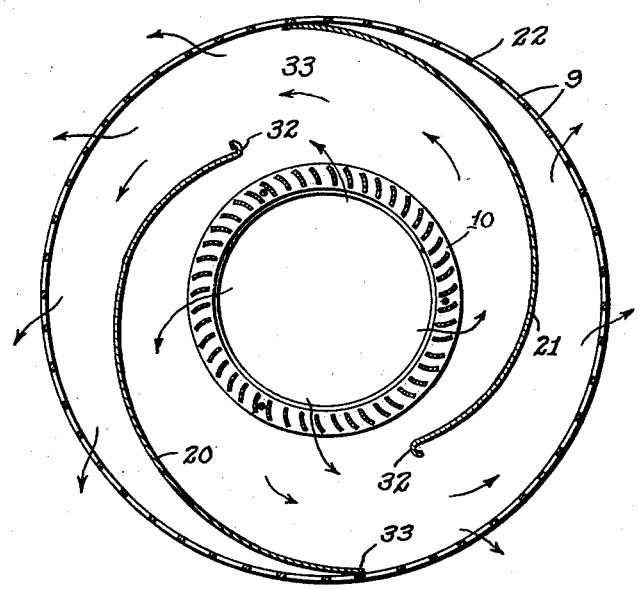
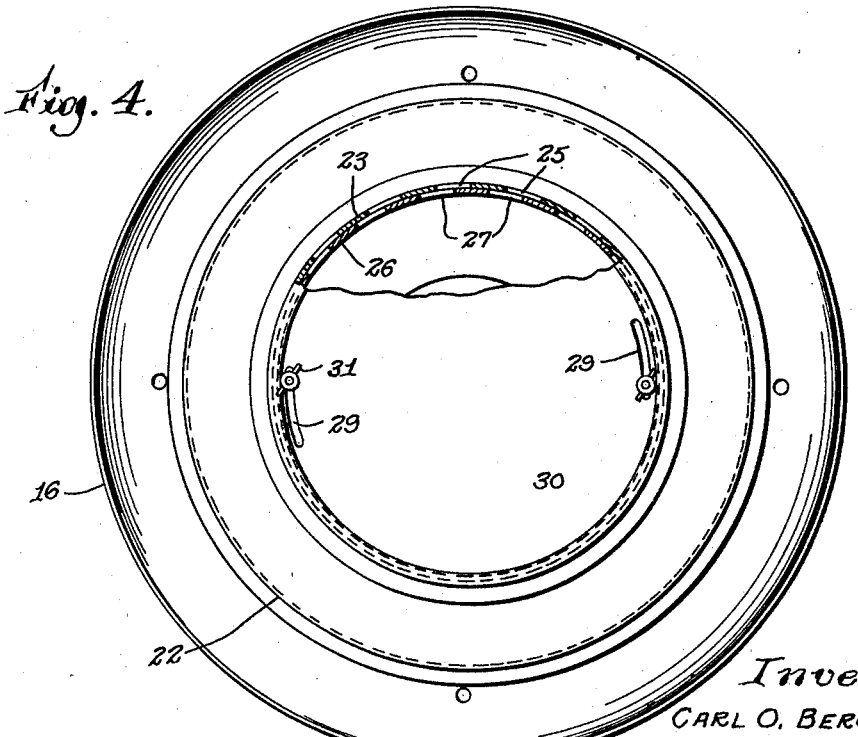

Patented Feb. 21, 1939

2,148,254

UNITED STATES PATENT OFFICE 2,148,254

CENTRIFUGAL FAN

Carl O. Bergstrom, Boston, Mass., assignor to B. F. Sturtevant Company, Boston, Mass.

Application October 1, 1937, Serial No. 166,803

4 Claims. (Cl. 230—270)

This invention relates to centrifugal fans and relates more particularly to centrifugal fans which may be suspended from the ceiling of an enclosure for providing pressure ventilation.

In many passenger vehicles such, for example, as railways passenger cars, it is desired to cool the passenger space by forcing relatively large volumes of air into the passenger space in what is termed "pressure ventilation". It has been proposed to use fans with propeller type blades for this purpose but the characteristics of propeller fans are such that they cannot efficiently build up sufficient pressure to move the relatively great volumes of air required.

Centrifugal fans efficiently develop relatively great air pressures, and according to this invention, a centrifugal fan is provided which may be mounted at the ceiling of a railway passenger car to project relatively large volumes of air downwardly into the passenger space and substantially uniformly over a substantial area. Several such fans may be spaced the length of the car to provide uniform air distribution throughout the entire passenger space.

An object of the invention is to provide a centrifugal fan adaptable for ceiling mounting for purposes of ventilation.

Other objects of the invention will be apparent from the following description taken together with the drawings.

The invention will now be described with reference to the drawings, of which:

Fig. 3 is a sectional view along the lines 3—3 of Fig. 2, and

Fig. 4 is an enlarged plan view with a portion in section, looking upwardly at Fig. 1.

Figure 1:
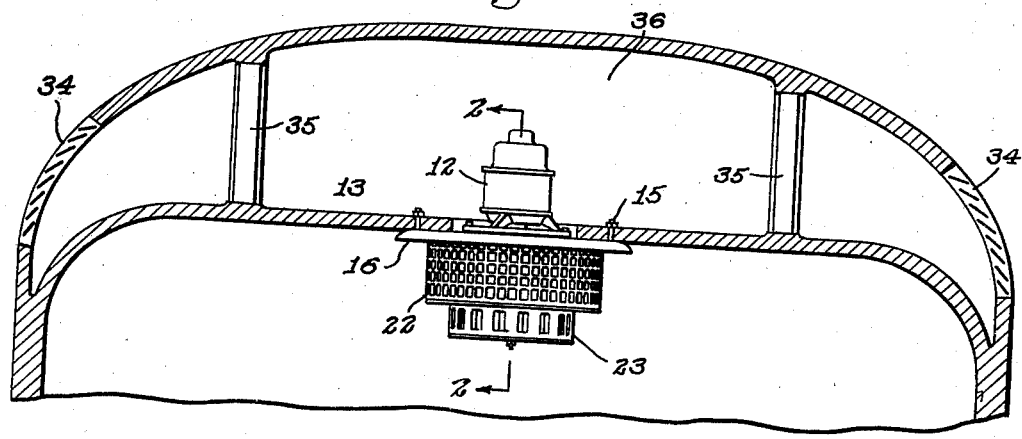
Fig. 1 is an elevation view of one embodiment of this invention, mounted in the ceiling of a railway passenger car.

The fan wheel 10 is open at both ends so as to have two air inlets and is mounted on the vertical shaft 11 of the motor 12. The motor 12 extends above the opening 14 in the ceiling 13 of the car, and the fan wheel 10 extends below this opening. The fan wheel 10 has forwardly curved blades of the centrifugal type. The direction of rotation with reference to Fig. 3, is counterclockwise.

Attached to the ceiling 13 at equally spaced points by the bolts 15, around the opening 14 is the deflector member 16, from which in turn is supported the motor 12 through the bolts 17, the supporting ring 18 and the arm 19.

The member 16 also supports the scrolls 20 and 21 and the perforated, cylindrical outer member 22, all of which may be attached to the member 16 in any suitable manner as by welding. The lower apertured, cylindrical member 23 is attached by welding to the base 24 of the member 22.

Figure 2:
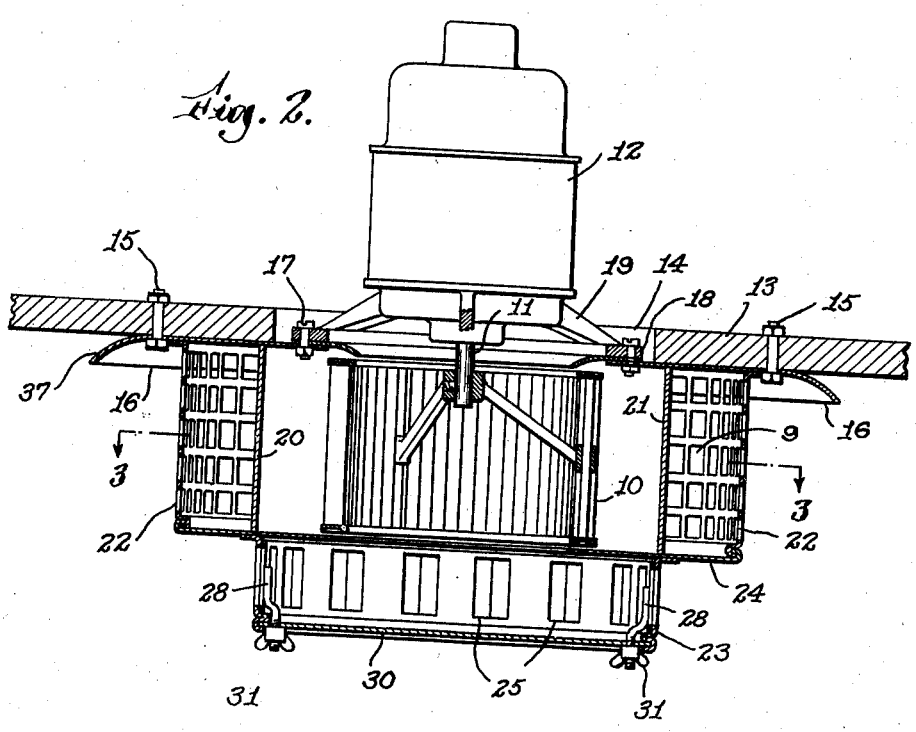
Fig. 2 is an enlarged sectional view along the lines 2—2 of Fig. 1.

The lower member 23 contains the plurality of equally spaced apertures 25. Rotatably mounted within the member 23 is the cylindrical inner member 26 which contains the apertures 27 which correspond in size and in number with the apertures 25 in the member 23. The bolts 28 are attached to the inner member 26 and extend through the slots 29 in the base 30 of the lower member 23 and carry the wing nuts 31 which when screwed tight against the base 30 hold the inner member 26 fixed with respect to the outer member 23. By adjustment of the wing nuts 31 and by rotation of the inner member 26, the apertures 27 and 25 may be placed in or out of alignment. Figs. 2 and 4 show these apertures as partially in alignment.

The lower cylindrical member 23 has a much smaller diameter than the upper cylindrical member 22. This provides that the apertures 25 are considerably spaced from the perforations 9 so as to discourage the "short-circuit" air flow from the perforations 9 to the apertures 25.

The scrolls 20 and 21 as shown by Fig. 3, are arranged on opposite sides of the wheel 10 and have their inner ends 32 terminating adjacent the wheel to form two cut-offs and have their outer ends 33 attached as by welding, to the inner side of the cylindrical member 22. In the embodiment illustrated the ends 32 of the scrolls are arranged, one towards each longitudinal side of the car.

The car in which the present embodiment is illustrated as shown in Fig. 1, has the fresh air inlets 34 and filters 35 through which outdoor air passes into the passage 36 with which the opening 14 in the ceiling 13 communicates. The inlets 34 are so arranged that movement of the car has no appreciable effect upon the air in the car.

In operation, the fan wheel 10 draws outdoor air through the opening 14 in the ceiling 13, into its upper inlet and if the apertures 25 and 27 are in full or partial alignment, draws recirculated air from the passenger space through the apertures into its lower inlet. The recirculated air and the primary or outdoor air is discharged peripherally from the fan wheel and is guided by the scrolls 20 and 21 so as to be discharged substantially equally around the periphery of the fan, through the perforations 9 in the upper cylindrical member 22.

The outer surface of one of the scrolls guides the air after it leaves the inner surface of the other of the scrolls, as indicated by the arrows of Fig. 3.

The recirculated air is drawn in when it is desirable to temper the primary air. If no recirculated air is required, the inner member 26 is rotated so that the apertures 25 and 27 are completely out of alignment.

Where it is not desired to recirculate air, the lower members 23 and 26 may be omitted, in which case the central opening would be omitted from the base 24.

The outer portions 37 of the member 16 are curved downwardly as shown by Figs. 1 and 2 to guide the air discharged through the perforations 9, downwardly.

While one embodiment of the invention has been described for the purpose of illustration, it should be understood that the invention is not limited to the exact arrangement and apparatus disclosed, as many departures may be made by those skilled in the art without departing from the spirit of the invention.

What is claimed is:

1. A centrifugal fan assembly adapted to be supported from a perforated ceiling, comprising in combination, a vertical shaft, a motor located at the upper end of said shaft, a centrifugal fan wheel mounted on the lower end of said shaft, means forming an air inlet passage into the upper portion of said wheel, a perforated cylinder around said wheel, and means forming an air inlet passage into the lower portion of said wheel, said last mentioned means including an apertured cylinder having a diameter substantially less than that of said perforated cylinder.

2. A centrifugal fan assembly adapted to be supported from a perforated ceiling, comprising in combination, a vertical shaft, a motor located at the upper end of said shaft, a centrifugal fan wheel mounted on the lower end of said shaft, means forming an air inlet passage into the upper portion of said wheel, a perforated cylinder around said wheel, means forming an air inlet passage into the lower portion of said wheel, said last mentioned means including an apertured cylinder having a diameter substantially less than that of said perforated cylinder, and means for varying the effective area of the apertures in said apertured cylinder.

3. A centrifugal fan comprising a supporting member, a fan wheel, means for supporting said wheel from said member, a plurality of oppositely disposed scrolls, means for supporting said scrolls from said member, a perforated cylinder around said scrolls and said wheel, the perforations in said cylinder forming air discharge passages from said scrolls, means for supporting said cylinder from said member, said member having a central aperture forming an inlet passage into one side of said wheel and having a downwardly curved, air deflecting, outer portion extending beyond and circumferentially around said cylinder, and a smaller apertured cylinder below said wheel, the apertures in said smaller cylinder admitting air into the other side of said wheel.

4. A centrifugal fan comprising a supporting member, a fan wheel, means for supporting said wheel from said member, a plurality of oppositely disposed scrolls, means for supporting said scrolls from said member, a perforated cylinder around said scrolls and said wheel, the perforations in said cylinder forming air discharge passages from said scrolls, means for supporting said cylinder from said member, said member having a central aperture forming an inlet passage into one side of said wheel and having a downwardly curved, air deflecting, outer portion extending beyond and circumferentially around said cylinder, a smaller apertured cylinder below said wheel, the apertures in said smaller cylinder admitting air into the other side of said wheel, and means for closing off said apertures in said smaller cylinder for varying the volume of air entering said other side of said inlet.

CARL O. BERGSTROM.